United States Patent
Mahide et al.

[11] 3,921,313
[45] Nov. 25, 1975

[54] INJECTION MOLDED BOOTS

[75] Inventors: Buhei Mahide, Ashikaga; Atushi Onai, Ohta, both of Japan

[73] Assignee: Kohkoku Chemical Industry Co., Ltd., Tokyo, Japan

[22] Filed: July 30, 1973

[21] Appl. No.: 384,099

[30] Foreign Application Priority Data

Nov. 27, 1972 Japan............................. 47-118720
Dec. 27, 1972 Japan............................... 48-1484
Jan. 19, 1973 Japan............................... 48-8324
Jan. 19, 1973 Japan............................... 48-8919

[52] U.S. Cl. .................................................. 36/4
[51] Int. Cl.² ........................................... A43B 1/10
[58] Field of Search................ 36/2.5 R, 7.1, 7.3, 4, 36/47, 48, 9 R

[56] References Cited
UNITED STATES PATENTS

| | | | |
|---|---|---|---|
| 2,838,854 | 6/1958 | Dosmann | 36/4 |
| 3,319,360 | 5/1967 | Nadler | 36/4 |
| 3,325,921 | 6/1967 | Potvin | 36/48 |
| 3,568,339 | 3/1971 | Hara et al. | 36/4 |

Primary Examiner—Patrick D. Lawson
Attorney, Agent, or Firm—Toren, McGeady and Stanger

[57] ABSTRACT

An injection molded boot comprising; a stretchable cloth base, a synthetic resin layer having desired printed patterns and colors on its surface over said stretchable cloth base, and a transparent resin layer injection molded over said synthetic resin layer.

5 Claims, 8 Drawing Figures

FIG. 3
FIG. 4
FIG. 5
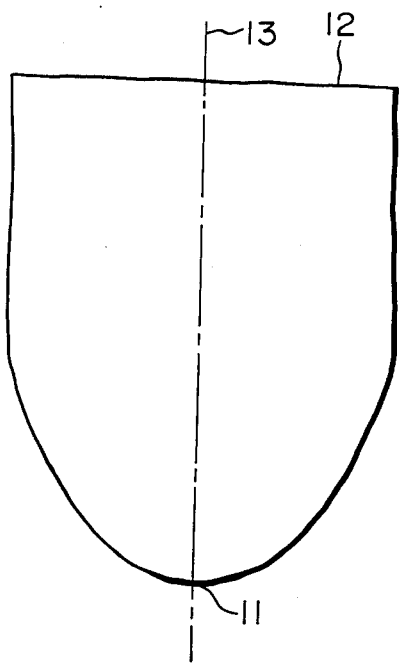
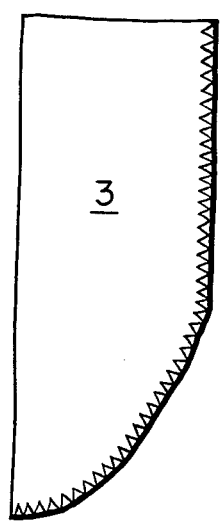
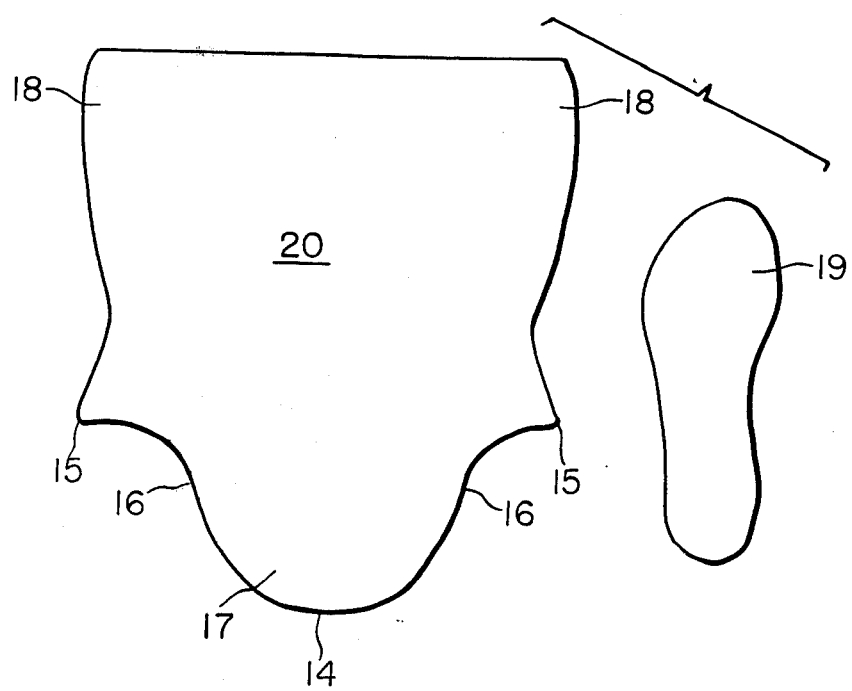

INJECTION MOLDED BOOTS

The present invention relates to a method of manufacturing injection molded boots having insteps with any desired colors and patterns. As injection molded boots, there have been conventionally known the following three kinds.

1. Injection molded boots having printing done on their surfaces.
2. Injection molded boots having colors and patterns on their insteps by mixing such fine decorating particles as golden powder, etc. into a PVC compound, etc. which is the injection molding material, then injection molding the same.
3. Injection molded boots having insteps with printed patterns and colors by making socks with printed knitted cloth or similar cloth being cut and sewed, then lasting said socks around lasts, and injection molding synthetic resin of transparent or semi-transparent nature with said lasts assembled with a mold or molds.

But, the injection molded boots as described in (1) have shortcomings that not only can a uniform printed pattern not be obtained, but the printed pattern is exposed to an external surface, and gradually becomes discolored, deteriorated, faded or peels as it is rubbed against other articles thus losing their design effectiveness. The injection molded boots as described in (2) are made by mixing fine design particles into a synthetic resin compound, which is the injection molding material, beforehand, then injection molding the same. But there is a limit in the size of the design particles which can be mixed in the thus injection molded boots, and large patterns can not be made and at the same time only boots as having random patterns can be obtained. The injection molded boots as described in (3) use socks obtained by cutting and sewing kitted cloth or similar cloth having prints thereon. Therefore the printed pattern is apt to be distorted when placed around lasts or the cloth itself may be split and the printed pattern on the injection molded boots obtained will not be clear. Furthermore, knitted cloth or similar cloth is thin and can be seen from outside. Moreover, when the interior lining is stained during use, said stains can be seen from the outside, or when damaged or worn the inside of the boots can be seen through from outside thus remarkably lowering the commercial value. Also the printed color migrates to the inside of shoes through the knitted cloth thus impairing the appearance.

An object of the present invention is to improve such shortcomings of conventional injection molded boots, and is to provide injection molded boots which have clear printed patterns which are not easily discolored, deteriorated, and have good strength.

Another object of the present invention is to provide injection molded boots having an upper body having a clear printed pattern without seams, thus having a high design value.

EXPLANATION OF DRAWINGS

FIG. 3 shows socks member to form socks with a single instep, and FIG. 4 shows the socks member of FIG. 3 as sewed. FIG. 5 shows socks instep member and socks sole member to form no seams at the socks front part and to form seams only at the rear part and sole part only of the socks.

Figure 1:
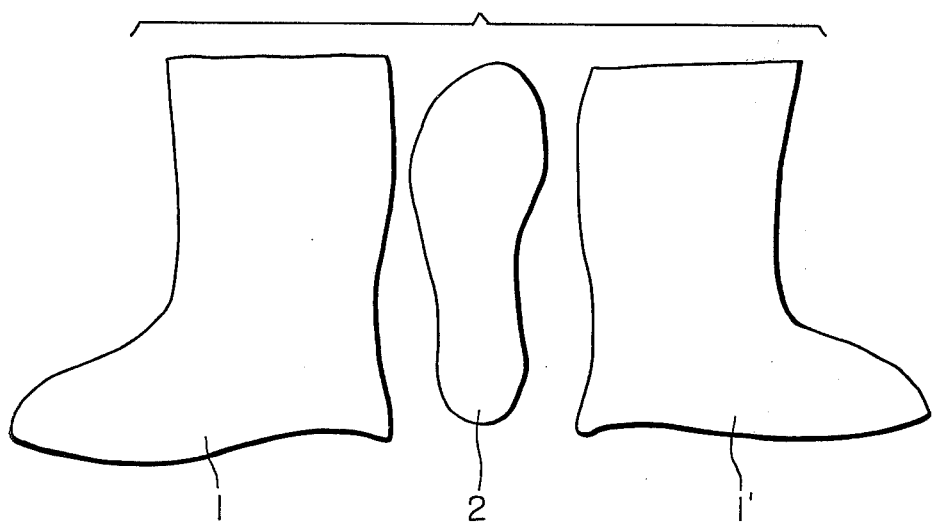
FIG. 1 shows two socks instep members and one socks sole member.

The present invention is to make socks (3) for boots by cutting and sewing printed leather which is obtained by embossing or printing colors and patterns on the surface of the synthetic resin layer of a stretchable synthetic resin leather made by laminating an opaque synthetic resin compound such as PVC, on a stretchable cloth with such conventionally used coating method as topping or coating, lasting said socks for boots around lasts 4 and bonding insole 9 as required, then assembling thereto a sole mold 5 and two side molds 6, forming an injection molding gap 7, then injecting and filling injection molding material from an injection outlet 8 into said molding gap 7. Then said injected and filled state is retained for a short period of time to cool and solidify the heated and molten injection molding material, then opening the sole mold 5 and side molds 6 to take out injection molded boots which are made by coating the socks for boots with transparent synthetic resin and at the same time forming soles.

Figure 2:
FIG. 2 shows socks for boots in which the socks instep members are sewed together.
Figure 6:
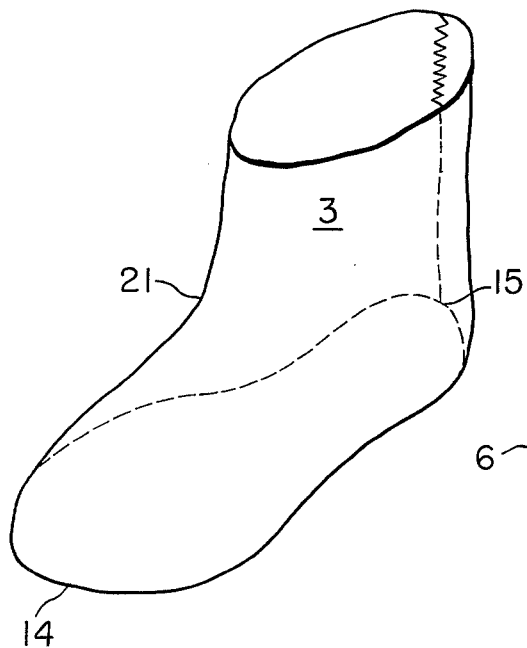
FIG. 6 shows the socks instep member and the socks sole member of FIG. 5 as sewed together.
Figure 8:
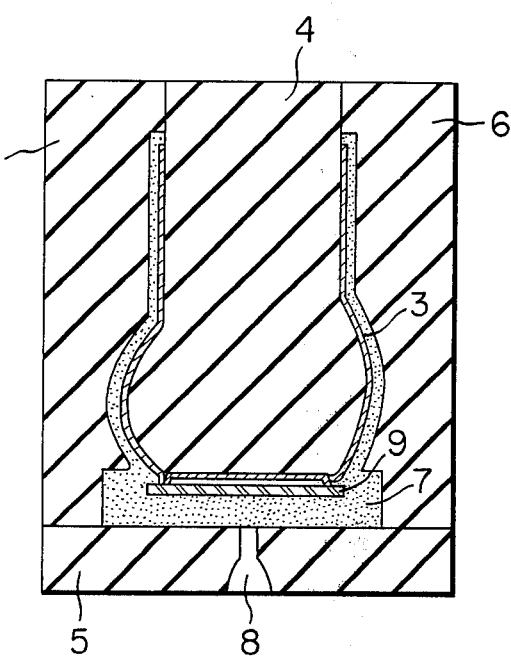
FIG. 8 is a schematic drawing for a method of manufacturing the injection molded boots of the present invention.
Figure 7:
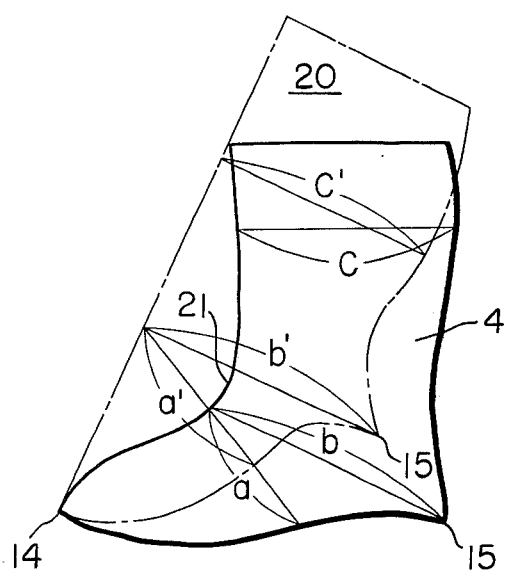
FIG. 7 is a schematic drawing to show the method of cutting the socks instep member shown in FIG. 5.

The socks for boots used in the present invention may be made by any one of the following three methods, that is socks for boots obtained by cutting a stretchable synthetic resin leather into such shape as shown in FIG. 3 having a protruding toe center part 11 at lower edge portion, then folding and overlapping the same at a center line 13 which passes through toetip center part 11 at the lower edge portion and the center point of a crest line 12 at upper edge portion, and sewing together the crest line portion as folded and overlapped (hereinafter such socks will be called as single instep socks), or socks obtained by cutting a stretchable synthetic resin leather into three members, as seen in FIG. 1 and FIG. 2, that is two socks instep members 1, 1' and one socks sole member 2, and sewing said three members together, or socks obtained by cutting a stretchable synthetic leather into such development shape that there is one point of inflection 16 between the toetip center part 14 and the heel center part at the lower edge portion 17, then making the portion between said point of inflection 16 and the toe in protruding shape while making the portion between the point of inflection 16 and the heel in concave shape, as seen in FIG. 5 and FIG. 6, then sewing both sides thereof together and at the same time sewing a socks sole member 19 to the lower edge part thereof.

When a stretchable synthetic resin leather is sewed and made into socks, the sewing thread may be transparent thread, semi-transparent thread or colored thread, but when transparent thread is used, the seam will not be seen from the outside enhancing the design effect of the boots, and not imparing the effect of the print.

The method of sewing together may be of so-called zig-zag sewing, that is, butt-jointing members to be sewed together and sewing said zig-zag jointed portion, or may be sewed together that is folding and/or overlapping members to be sewed together and sewing the embroidary portion thereof, but zig-zag sewing is advantageous in appearance and in practical application. When single instep socks are used, the printed pattern will be present both at the instep surface and the socks sole part, but in the case of socks obtained by sewing together two sock instep members and a single sock sole member, said three members may all have printed patterns, or the two socks instep members only may have printed pattern while the socks sole member has no printed pattern. Further, each of the three members, that is, the two socks instep members and a single socks sole member may have different pattern or colors.

The printed patterns applied to the stretchable synthetic resin leather may be of flat shape or of embossed printed patterns that is the printed pattern portion is either a protruding or concave shape. As the stretchable synthetic resin leather on which colors and patterns are printed, a cloth with substantial stretchability and expansibility, for example, a knitted or woven cloth made with spandex (Tradename) fiber having such synthetic resin compounds as PVC resin or polyurethane resin, etc., laminated thereto by such laminating method as topping or coating, may be used. Also said stretchable synthetic resin leather may be of non-foamed leather or foamed leather, but the foamed leather is desirable as it has better expansibility. Particularly, the one with an expansibility of 120 to 200% will be best suited. As transparent sewing thread, ordinarily used fiber thread of transparent nature may be used, such as, nylon thread, vinylon thread, tetron thread, etc. As a last 4, sole mold 5, side molds 6 which are used in ordinary injection molding may be used in the present invention, but especially metallic molds are better. Concerning molds, two side molds and one sole mold may be used in combination or two molds which include sole portion may be used in combination.

As injection molding material, commonly used thermoplastic resins, such as, resin, urethane resin, etc., or transparent rubber may be used. The word "transparent" in this case includes semi-transparent and means that the pattern provided on the surface of the socks made of stretchable synthetic resin leather can be seen through the resin. When stretchable synthetic resin leather is used as a socks sole member, zig-zag sewing with transparent sewing thread should be used to make socks for boots which has seams between the socks sole member and two socks instep members cannot be seen from the outside, then said socks for boots are lasted around and the synthetic resin is injection molded with the said lasts assembled with molds, thus beautiful boots having printed pattern at the sole part can be obtained.

When material having no printed pattern is used as the sock sole member, the seam between the socks sole member and interior instep or exterior instep may be made by sewing together or by zig-zag sewing, but when the midsole is not bonded, zig-zag sewing with transparent sewing thread may be used to conceal seams. Furthermore, when the midsole is bonded, the sewing between interior instep and exterior instep may be done with transparent thread while opaque sewing thread may be used between the socks sole member and interior instep or exterior instep. When the midsole is not bonded, the sewed-together portion should best be sewed with all transparent sewing thread. When injection molding is done with an opaque synthetic resin, only for the sole, such as, in two-color injections, or when the sole portion only of the injection molded boots is colored to make it non-transparent, the sewing together between the socks sole member and interior instep or exterior instep may be sewed by non-transparent sewing thread while sewing together between interior instep and exterior instep only should be done with transparent sewing thread.

The relationship between the structure of inner mold (last) 4 and the lower edge portion 17 of the instep member 20, which is obtained by cutting stretchable synthetic resin leather to such shape that its development shape has one point of inflection 16 between the toetip center part 14 and heel center part 15 at the lower edge portion and the portion between said point of inflection 16 and toe is made protruding shape while the portion between the point of inflection 16 and heel has concave shape, will be such that the degree of protrusion in the protruding portion between the point of inflection 16 and toe will be determined according to the shape of the toe portion of the boots, and as the curvature of the curvature portion 21 between the upper body at front portion of boots and the toe portion becomes greater, the degree of concaveness in the concave portion between the point of inflection 16 and the heel becomes greater.

When an inner mold (last) which has socks 3 placed therein is assembled with outer molds 6 to make boots by coating the socks 3 with synthetic resin by injection molding, the socks 3 need to be in close contact with the inner mold (last) 4 for coating the synthetic resin. The socks 3 which are made by such cutting and sewing as mentioned above has instep member 20 composed of a single sheet and has no seams at front portion thereof. Even if sock 3 is made using a leather material with little stretchability and expansibility, as its instep member 20 is cut in such manner as mentioned above, that is, it is cut so that the distances $a, b, c \ldots$ between any two points on the surface of the interior mold (last) 4 becomes almost equal to those distances $a', b', c' \ldots$ between such two points on the instep member 1 as corresponding to the positions of the above mentioned any two points, when the socks 3 is placed around the inner mold (last), therefore, the distortion or warp of the socks 3, when the socks 3 is placed around the inner mold (last), will become uniform, and the socks 3 can be placed around the inner mold (last) for boots having the upper body in a closely contacting manner. Therefore, such injection molded boots with upper body having excellent design value can be obtained that clear printed pattern on the surface of leather can be shown without distortion having no seams in front thus printed pattern is not broken at front portion of boots further there is no unsightly variation in thickness of transparent synthetic resin covering the socks 3. Also there are less seams than those in the socks composed of three members, lowering production cost.

Since knitted fabric leather having patterns and colors printed on the surface of a synthetic resin layer are used in the present invention as explained above, boots with any desired colored patterns of either large size patterns or small size patterns can be obtained, and furthermore said boots will have higher strength than that of the one which uses socks with knitted cloth having printed patterns thereon, and the printed pattern can appear in more clear and distinct manner than the one with printing done on the knitted cloth. Moreover, even when the knitted cloth is stained or damaged through long time use such stains will not be seen from the outside and the inside of the boots will not be seen from outside through such damaged portion since there exists synthetic resin layer over the knitted cloth. Also, there will be no distortion of printed patterns and no obscuring of the printed patterns due to a split in the knitted cloth. Furthermore, there will be no migration of the printed color to the inside of the boots, keeping the inside of boots clean because printing is not done directly on the knitted cloth but on the outer surface of the synthetic resin layer provided over the knitted cloth.

When two socks instep members are zig-zag sewed with transparent sewing thread, especially as transparent synthetic resin is injection molded to make boots, the sewing thread at the sewed portion will not be visible from outside as in conventional boots, thus providing a better appearance, and at the same time, there will be no stepped part at the sewed portion thus providing boots which are comfortable to wear. Moreover beautiful boots having printed patterns even at the sole portion can be obtained, and by varying the printed patterns on the two socks instep members and socks sole member, boots with unique printing can be obtained.

When socks for boots are used wherein a stretchable synthetic resin leather is cut to the shape shown in FIG. 3 having one protruding toetip center part at the lower edge portion, then is folded and overlapped at the center line passing through the center part of the toetip at the lower edge portion and central point of the crest line at the upper edge portion, then for the overlapped crest line portion except the crest line at the upper edge portion is sewed together, or when such socks for boots are used wherein a stretchable synthetic resin leather is cut to have a shape such that there is one point of inflection between toetip center part and heel center part at lower edge wherein the portion from said point of inflection toward toe is made with protruding shape while the portion toward heel is made to have concave shape, then both side edges of the same are sewed together, and sole member is sewed to the lower edge of the same, the pattern at the front portion of the injection molded boots thus obtained will have no breaking lines, thus enhancing design effect.

Furthermore, in injection molded boots obtained by placing socks for the boots around lasts, bonding an insole to the bottom part of the socks placed around the lasts, and then then assembling a boot-sole mold thereto and two side molds to inject and fill an injection molding material into molding gap thus formed, when the sole of the injection molded boots is colored with same color as that of the insole, even if the color of the sole of boots is partially peeled off the color of the insole will become visible through said peeled off portion, thus it appears as if there is no peeling from the outside, which enhances the design effect.

Examples of the present invention are shown below, although the present invention is not be limited thereto.

EXAMPLE 1

PVC resin compound containing a foaming agent was applied by topping on a knitted cloth with a calender, then said cloth was placed in a foaming oven to obtain foamed PVC leather with good expansibility. Patterns with a panda or pandas and flowers were printed on the surface of the synthetic resin layer of said foamed PVC leather to obtain printed leather, and said printed leather was cut to the shapes of socks instep members 1 and 1' the shapes being symmetric and a socks member 2 was prepared by cutting non-printed leather.

The two socks instep members 1, 1' and socks sole member 2 were zig-zag sewed with transparent nylon thread to obtain socks 3 for boots. Said socks 3 for boots were placed around lasts 4 made of aluminum, bonding insole 9 thereto, then assembling thereto a boots-sole mold 5 and side mold 6 both being made of aluminum, forming injection molding gap 7, then transparent PVC compound was injected and filled into said molding gap 7 from injection outlet 8. After cooling and solidifying the PVC compound which was heated and molten when injection molded, the sole-mold 5 and the side-mold 6 were opened to obtain injection molded boots in which socks 3 for the boots were covered with a transparent synthetic resin and at the same time sole was formed.

EXAMPLE 2

PVC resin compound containing a foaming agent was applied over a knitted cloth by topping using a calender, then after forming a foam in a foaming oven, printed patterns were placed on the surface of the synthetic resin layer of the foamed PVC leather. Then instep member 20 and sole member 19 were cut out. The instep member 20 had a shape such that one point of inflection 16 exists between toetip center part 14 and heel center part 15 at the lower edges, and portion from said point of inflection toward toe had protruding shape while the portion toward the heel had a concave shape as shown in FIG. 5. The degree of protrusion and concaveness was determined by the shape of the toe part of the boots to be made and the degree of curvature at the curved part 21 between the upper body of boots front part and toe part. A concave part was provided at the lower portion at side edges 18 of the instep member 20, which was to form the achilles' tendon of the boots to be made.

The sole-member 19 had the shape of a foot print having the same length as that of the lower edge 17 of the instep member 20.

Side edges 18 of the instep member 20 were zig-zag sewed and the lower edge 17 of the instep member 20 and circumferential edges of the sole member 19 were zig-zag sewed. At that time, a transparent nylon thread was used as sewing thread. The socks 7 thus made was placed around inner mold (last) 4 made of aluminum, and outer molds (mold) 5, 6 made of aluminum were assembled thereto, forming injection molding gap, then transparent PVC compound was injected out of injection outlet 8 filling said molding gap. After cooling and solidifying the PVC compound which was heated and molten in the injected and filled state, molds 5, 6 were opened and injection molded boots which had socks 3 covered with transparent synthetic resin and as sole formed therein, were obtained. The boots, having an upper body thus obtained had no break in the printed pattern at the front portion and patterns printed on the surface of synthetic resin layer of the leather composing the socks 3 can be clearly seen without distortion through the transparent synthetic resin, were obtained.

EXAMPLE 3

PVC resin compound containing a foaming agent is applied over woven cloth made of Spandex fiber thread by topping with a calender. Then a printing pattern is gravure printed on the surface of synthetic resin layer of the foamed vinyl leather obtained by foaming the agent foamed in a foaming oven, then the leather was cut to the shape shown in FIG. 3, and was folded and overlapped at a central line which passes through the toetip center part at the lower edge portion and the center point of the crest line at upper edge portion. The thus folded and overlapped crest line portion was sewed together except for the upper edge crest line to obtain socks 3 for boots. Said socks 3 for boots were placed around lasts 4 and a yellow-colored insole 9 was bonded to the socks 3, then a sole mold 5 and two side molds 6 were assembled thereto, forming injection molding gap 7, then injection molding material made of transparent PVC resin was injected and filled from an injection outlet 8 into said molding gap 7. After cooling and solidifying the PVC which was heated and molten in said injected and filled state, the molds 5, 6 were opened and injection molded boots in which the socks 3 were covered with transparent synthetic resin and at the same time sole was formed therein, were obtained. The sole part only of said injection molded boots were dipped in the same yellow coating material solution as that of the insole, then the boots were dried.

The injection molded boots thus obtained had no seams at their front part and as a result the printed pattern was not broken at the front part of the boots, and the patterns printed on the surface of synthetic resin layer of the leather composing the socks 3 were clearly visible without distortion through the transparent synthetic resin.

Further as the outer circumference of the sole part was covered and colored with same color as that of the insole, even when the coated layer at outer circumference at sole part is partially peeled off the color of the insole will be visible from said peeled off part through transparent sole, thus appearance was not impaired.

What is claimed is:

1. A boot which comprises:
   A. a boot sock having a toe portion, a shank portion and a curved instep portion leading from the toe portion to the shank portion and a bottom sole portion, said sock being composed of a synthetic leather laminate prepared by coating a stretchable textile fabric inner layer with a synthetic resin outer layer, said outer layer having a decorative pattern printed thereon, the boot sock being constructed from one or more sewn together pieces of said laminate wherein the sewn portions appear only in the back of the shank portion or the sole portion wherein the sewn portions are sewn together with transparent sewing thread; and
   B. an insole bottom adjacent said sole portion; and
   C. a transparent resin layer injection molded over the boot sock and insole combination.

2. The boot of claim 1 wherein the sock is formed from a single piece of the laminate, said piece having four sides, a first side being an upwardly and convexly curving toe portion, a second straight side opposite said first side and two opposing sides proceeding from the first side to the second side, said piece being folded upon itself along a line bisecting the centers of the first and second sides, the edges of the opposing and first sides resulting from said folding being sewn together leaving an opening created by the unsewn second side.

3. The boot of claim 1, wherein the textile fabric is a knitted fabric.

4. The boot of claim 1, wherein the textile fabric is formed from a spandex fiber.

5. A boot which comprises:
   A. a boot sock having a toe portion, a shank portion and a curved instep portion leading from the toe portion to the shank portion and a bottom sole portion, said sock being composed of a synthetic leather laminate prepared by coating a stretchable textile fabric inner layer with a synthetic resin outer layer having a decorative pattern printed thereon, the boot sock being constructed from one or more sewn together pieces of said laminate wherein the sewn portions appear only in the back of the shank portion or the sole portion; and
   wherein the sock is formed from two pieces of the laminate, the first piece forming the toe, shank and instep portions and the second piece forming the sole portion, said first piece being symmetrical and having a bottom curved toe portion and a top straight portion, and opposing sides curving outwardly from the center of the curved toe portion to a point of inflection and then inwardly and outwardly up to the back portion wherein the edges of the opposing side portions are sewn together to form the toe, instep and shank portions and the sole portion is sewn to the bottom thereof; and
   B. an insole bottom adjacent said sole portion; and
   C. a transparent resin layer injection molded over the boot sock and insole combination.

* * * * *